(12) United States Patent
Taylor et al.

(10) Patent No.: US 7,169,466 B2
(45) Date of Patent: Jan. 30, 2007

(54) MULTIPLE-COMPONENT BINDER SYSTEMS FOR POROUS COMPOSITE BLOCKS

(75) Inventors: Eric P. Taylor, Pleasanton, CA (US); Edward B. Rinker, Pleasanton, CA (US)

(73) Assignee: The Clorox Company, Oakland, CA (US)

(*) Notice: Subject to any disclaimer, the term of this patent is extended or adjusted under 35 U.S.C. 154(b) by 154 days.

(21) Appl. No.: 10/850,920

(22) Filed: May 21, 2004

(65) Prior Publication Data
US 2005/0260396 A1 Nov. 24, 2005

(51) Int. Cl.
*B32B 5/00* (2006.01)

(52) U.S. Cl. .............. 428/317.9; 428/317.1; 210/496

(58) Field of Classification Search ......... 428/304.4, 428/317.9, 318.4, 323, 327, 330, 332, 411.1; 264/109, 122, 123; 210/500.1, 506, 510.1, 210/542
See application file for complete search history.

(56) References Cited

U.S. PATENT DOCUMENTS

| | | | |
|---|---|---|---|
| 4,753,728 A | 6/1988 | VanderBilt | 210/282 |
| 4,859,386 A | 8/1989 | VanderBilt | 264/113 |
| 4,980,073 A | 12/1990 | Woodruff | 210/767 |
| 5,017,318 A | 5/1991 | Vanderbilt | 264/113 |
| 5,076,912 A | 12/1991 | Belz | 210/94 |
| 5,344,558 A | 9/1994 | Kool | 210/117 |
| 5,679,248 A | 10/1997 | Blaney | 210/315 |
| 5,882,517 A | 3/1999 | Chen | 210/496 |
| 5,922,803 A | 7/1999 | Koslow | 524/496 |
| 5,935,887 A | 8/1999 | Sudo | 501/80 |
| 6,099,728 A | 8/2000 | Bairischer | 210/266 |
| 6,171,433 B1 | 1/2001 | Otaigbe | 156/272.2 |
| 6,274,041 B1 | 8/2001 | Williamson | 210/243 |
| 6,368,504 B1 | 4/2002 | Kuennen | 210/315 |
| 6,395,190 B1 | 5/2002 | Koslow | 210/767 |
| 6,461,546 B1 | 10/2002 | Noid | 264/9 |
| 6,565,749 B1 | 5/2003 | Hou | 210/500.38 |

(Continued)

FOREIGN PATENT DOCUMENTS

WO   WO2001014257 A1   3/2001

(Continued)

OTHER PUBLICATIONS

Derwent Abstract of Japanese Patent 60260484, Moulded Body Prodn. From Lightweight Granuels Obtd. by Packing Fibrous Material and Lightweight Granuels In Mould, and Injecting Liq. Binder, Dec. 23, 1985.*

*Primary Examiner*—Terrel Morris
*Assistant Examiner*—Anish P. Desai
(74) *Attorney, Agent, or Firm*—Ann M. Lee (57) ABSTRACT

A porous composite block is provided that contains at least two groups of binding agent particles. The first binding agent particles have an average particle size between about 5 μm and 200 μm. The second binding agent particles have an average particle size no larger than half the average particle size of the first binding agent particles and also between about 10 nm and 30 μm. The porous composite block can also contain active grains and active granules such that the granules are smaller than the grains. The grains and the granules can be capable of treating water. A method of forming a porous composite block and a water treatment system are also provided.

18 Claims, 4 Drawing Sheets

U.S. PATENT DOCUMENTS

| | | |
|---|---|---|
| 2002/0062740 A1 | 5/2002 | Brukov .................. 96/153 |
| 2002/0195407 A1 | 12/2002 | Levy .................. 210/767 |
| 2003/0034290 A1* | 2/2003 | Tochikubo et al. ......... 210/243 |
| 2003/0140785 A1 | 7/2003 | Koslow .................. 95/90 |
| 2004/0168972 A1 | 9/2004 | Hughes et al. |
| 2004/0168973 A1 | 9/2004 | Hughes et al. |

FOREIGN PATENT DOCUMENTS

| | | |
|---|---|---|
| WO | WO2002070104 A1 | 9/2002 |
| WO | WO2002076577 A2 | 10/2002 |
| WO | WO2003089112 A1 | 10/2003 |
| WO | WO2003089113 A1 | 10/2003 |

* cited by examiner

MULTIPLE-COMPONENT BINDER SYSTEMS FOR POROUS COMPOSITE BLOCKS

BACKGROUND OF THE INVENTION

1. Field of the Invention

The present invention is directed generally to binders for porous composite particle blocks and, more specifically, to binders for porous composite carbon block water filters.

2. Description of the Related Art

Typically, a composite block filter is a hollow core cylindrical block of bonded, activated carbon grains. Water flows through the perimeter of the carbon filter, into the center core and on to the user. It is the interaction of water with the carbon surface that removes impurities.

However, carbon alone cannot remove all the impurities of interest. Often additional active media (actives) are mixed with activated carbon and binder particles before a porous composite block filter is formed. It is desirable to use actives in fine granular form to optimize the surface area per unit volume. When a mixture of activated carbon grains, binder particles, and fine granular actives is heated and pressed to form a porous composite block filter, the carbon grains and the similarly-sized binder particles form a basic network structure. Many of the much smaller active granules are subsequently lost as they fall out of the block through channels within the network.

Accordingly, there is a need for improved processes and materials for making porous composite block filters that can include active grains of various sizes.

SUMMARY OF THE INVENTION

A porous composite block is provided that contains at least two groups of binding agent particles. The first binding agent particles have an average particle size between about 5 μm and 200 μm. The second binding agent particles have an average particle size no larger than half the average particle size of the first binding agent particles and also between about 10 nm and 30 μm. The porous composite block can also contain active grains and active granules such that the granules are smaller than the grains. The grains and the granules can interact with fluids, such as water, to remove contaminants.

A method of forming a porous composite block and a water treatment system are also provided.

BRIEF DESCRIPTION OF THE DRAWINGS

The foregoing aspects and others will be readily appreciated by the skilled artisan from the following description of illustrative embodiments when read in conjunction with the accompanying drawings.

DETAILED DESCRIPTION

The embodiments of the invention are illustrated in the context of porous composite carbon blocks for use in water filtration systems. The skilled artisan will readily appreciate, however, that the materials and methods disclosed herein will have application in a number of other contexts where porous composite blocks that have large amounts of surface area available for interaction with a fluid are desirable, such as, for example, in air purification, or catalytic treatment.

The term "porous composite block" is used herein to mean a block that is porous and permeable to a fluid. Porous composite blocks are usually made of granular media that are held together by a binder material. As used herein, the term "fluid" is meant to include both gases and liquids.

The terms "grain", "granule", and "particle" are all used to indicate a discrete portion of matter. The terms can be used interchangeably, but for ease of understanding, an attempt has been made to use "grain" when referring to large active grains, such as activated carbon grains, "granule" when referring to other smaller active granular components, and "particle" when referring to binding agents.

The terms "active grains", "active granules", and "actives" are all used to mean granular water filter components that can interact with water to remove contaminant(s).

The term "binding agent particle" is used to mean a particle which, after a processing treatment, can stick to an active granular component (including both grains and granules) in a porous composite block water filter and thereby contribute to the block's physical integrity. In some cases, the binding agent particles can also act as actives as defined above.

The terms "grain size", "granule size", and "particle size" refer to a parameter we will call the average diameter, $\bar{d}$, of a body when all possible diameters of the grain, granule, or particle are taken into account. For example, all diameters of a perfect sphere have the same length. The size or average diameter of a perfect sphere is the same as the diameter. For irregularly shaped bodies, the size or average diameter, $\bar{d}$, can be determined $$\bar{d} = \left[\frac{2}{\pi}\int_S \vec{\rho}\cdot\vec{n}d\sigma\right]^{\frac{1}{3}}$$

by the expression: where $\vec{\rho}$ is the vector from an origin of the body to a surface area $d\sigma$, and $\vec{n}$ is the normal vector at surface area $d\sigma$. The equation is derived from an application of Gauss's Theorem that relates the volume of a body to a surface integral.

Conventionally, the basic components of porous composite carbon block filters include activated carbon grains and binding agent particles. Other actives can also be included in the blocks as desired for specific fluid treatment applications. Examples of other actives include activated alumina, activated bauxite, fuller's earth, diatomaceous earth, sand, glass, clay, silica gel, calcium sulfate, magnesia, ceramic particles, zeolite particles, inert particles, silica, mixed oxides, surface charge-modified particles, cationic materials (including polymers such as polyaminoamides, polyethyleneimine, polyvinylamine, polydiallyldimethylammonium chloride, polydimethylamine-epichlorohydrin, polyhexamethylenebiguanide, poly-[2-(2-ethoxy)-ethoxyethlyl-guanidinium chloride which may be bound to fibers (including polyethylene, polypropylene, ethylene maleic anhydride copolymers, carbon, glass, etc.), carbon fibers, metal oxides, metal hydroxides or mixtures thereof. Additional active components can be chosen for their fluid purification properties.

Additional examples of actives that can be used in water filters are disclosed in U.S. Pat. Nos. 6,274,041 and 5,679,248, which are incorporated by reference herein.

For water flowing through a porous composite filtration block at a rate of at least 0.2 gallons per minute, differential pressures ranging from about 40 psi to 80 psi between the inlet region and the outlet region are acceptable for most water treatment applications. For water flowing through a porous composite filtration block at a rate of at least 0.01 gallons per minute, differential pressures of less than about 0.5 psi between the inlet region and the outlet region are acceptable for most water treatment applications.

The process of binding carbon grains together to form porous composite carbon blocks involves some loss of exposed active surface, as the portions of the active surfaces that are bound are no longer exposed. Therefore it is useful to bind grains together in ways that minimize active surface loss. Variables affecting the ability of a binder material to minimize active surface loss and to form a useful porous composite block include chemical structure and functionality, molecular weight, microstructure, viscosity or melt flow rate, percent composition, particle size, and the relative sized of binder particles and active grains.

Conventionally, UHMW polymers with very low melt indices have been popular binding agents because they can stick to carbon grains without flowing and without significantly wetting the grains during processing. Binder particle sizes that are used are typically similar to the sizes of the grains. Examples of such binders include GUR resins, a series of ultra-high molecular weight polyethylene (UHMWPE) powders made by Ticona with melting points of about 135° C. and typically with average particle sizes ranging from about 100 to 150 µm. UHMWPE resin powders are also available in sizes smaller than 50 µm from Ticona and Mitsui Chemical. Mixtures of activated carbon grains and UHMWPE binder particles are processed typically at temperatures around 245° C. for 30 minutes to form carbon blocks for water filtration. UHMWPE resin does not melt, flow, or liquefy at its melting point, retaining its dimensional stability until temperatures well above 200° C. UHMWPE resins typically have a high load melt index (HLMI) of less than 1.0 gram/10 min at 190° C. with a 15 kg load. Some UHMWPE resins have even lower HLMI values, such as an HLMI of less than 0.1 gram/10 min. Resistance to melt flow enables the UHMWPE resins to bind grains of similar size without significantly wetting the grains.

Figure 1:
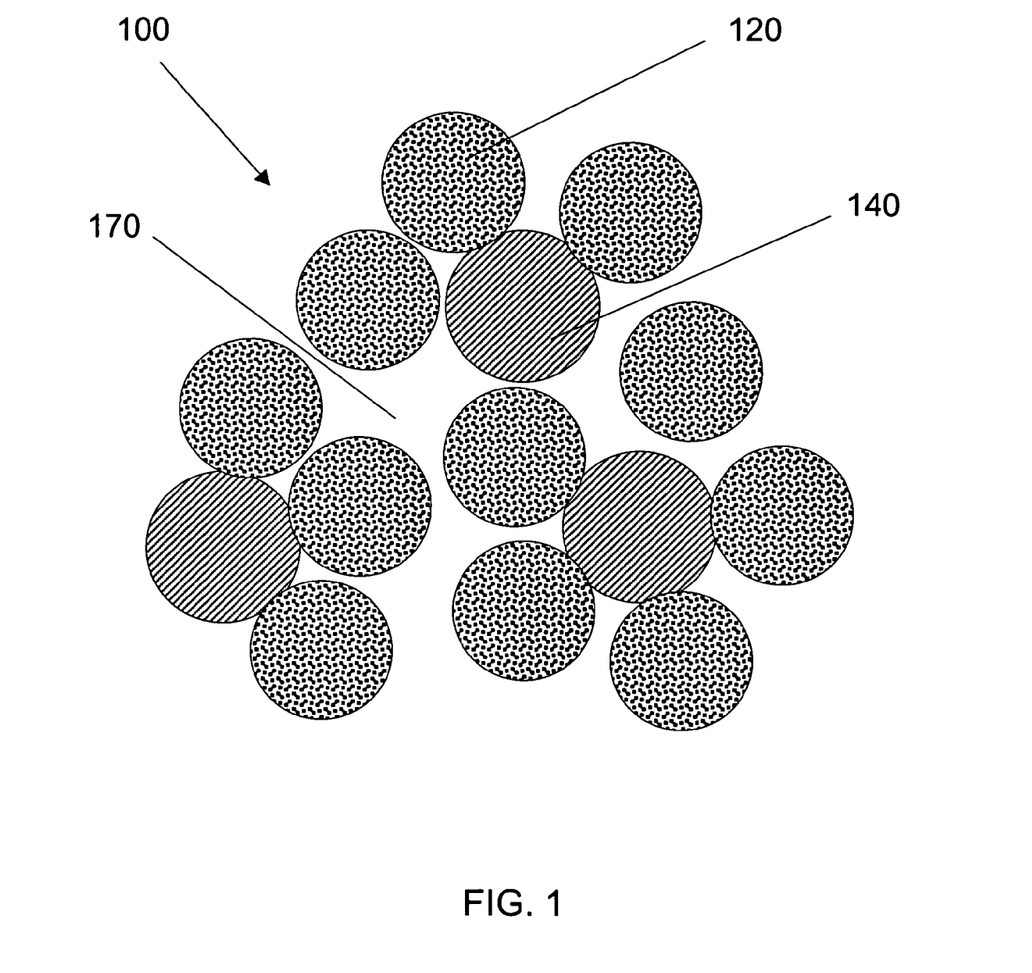
FIG. 1 is a schematic cross section of a matrix for a porous composite block filter formed from similarly-sized active grains and binding agent particles

The binding of similarly sized active grains and binding agent particles can form a structure that can function as a load-bearing matrix for a porous composite block filter. An exemplary, simplified schematic cross section of such a structure is shown in FIG. 1. A portion 100 of a porous carbon block structure shows several activated carbon grains 120 interspersed with similarly sized binder particles 140 after undergoing treatment to coalesce. The grains 120 and the binder particles 140 are shown as spheres for ease of illustration. In general, carbon grains and binder particles can have very irregular shapes. In an actual porous composite block there are many other grains and binder particles in proximity to the structure 100 shown in the plane of the page and above and below the plane of the page. The binding agent particles 140 have not melted or flowed, but they have softened enough for some activated carbon grains 120 to press into the binding agent particles 140 during compression molding, thus forming a basic structure or matrix 100 of carbon grains 120 and binding agent particles 140. The structure 100 includes many open spaces 17 through which fluids can flow.

The interaction of water with the surfaces of actives removes dissolved contaminants from the water. In many filter applications, it is desirable to use small granules as they provide more surface area per unit volume than do coarse grains. Thus, in theory, porous composite block filters could be made smaller and yet provide the same amount of available surface area for water filtration by using smaller sized active granules.

There are some issues to consider when incorporating very small granules into porous composite block filters. If active granules (not shown in FIG. 1) are too small, they can inhibit water flow by packing too closely into the spaces 170 within the basic carbon grain-binding agent particle structure 100. Small actives can also be flushed out of a porous composite block filter as fluids flow through the spaces 170 within the basic structure 100.

Figure 2:
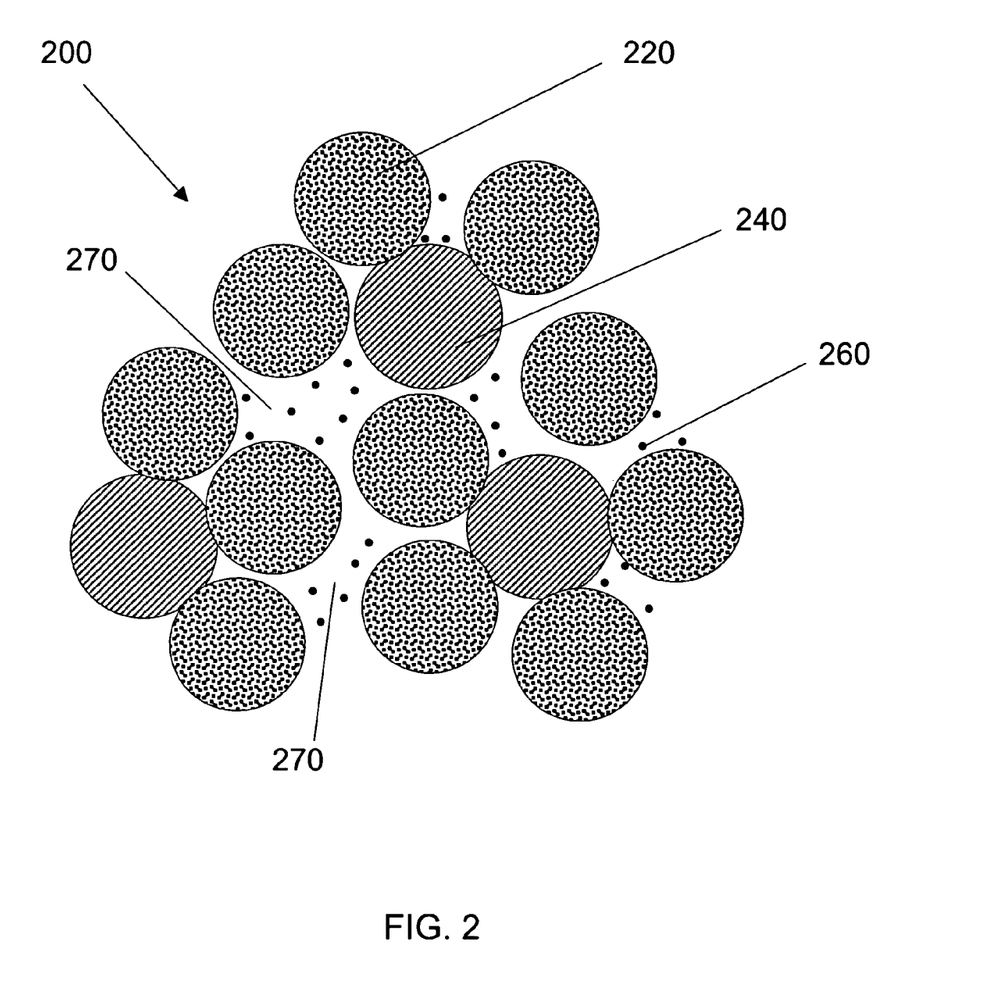
FIG. 2 is a schematic cross section of a matrix as shown in FIG. 1, which also contains small actives that can move about freely in the spaces within the matrix.

FIG. 2 is an exemplary illustration of how some small actives in porous composite block filters can move about freely. A portion 200 of a porous carbon block structure shows several activated carbon grains 220 bonded onto similarly-sized binder particles 240 to form a basic structure for a porous composite carbon block filter as has been discussed above with reference to FIG. 1. There are also active granules 260 interspersed throughout the basic structure. In this example, the activated carbon grains 220 have a grain size of about 100 µm, the binding agent particles 240 have a particle size of about 110 µm, and the active granules 260 have a granule size of about 5 µm.

In order to form a porous composite carbon block, energy, such as heat and pressure, is applied to a mixture of carbon grains 220, binding agent particles 240, and active granules 260. The large components, the carbon grains 220 and the binding agent particles 240 are pressed together, and a structural matrix is formed. Very few, if any, of the small active granules 260 are pressed into the binding agent particles 240, as the granules 260 can more easily move to occupy the spaces 270 within the matrix.

When a porous composite carbon block 200 is first used as a water filter, water flows through channels 270 within the block 200. Many unattached active granules 260 are carried along with the water as it flows through the channels 270. Some active granules 260 can become lodged in small openings between grains 220, thus contributing to filter clogging. Other active granules 260 can flow out of the block completely. After only a few passes of water through the block 200, a substantial portion of the active granules 260 can be lost to the block, and therefore would be unavailable to provide the water treatment intended.

Figure 3:
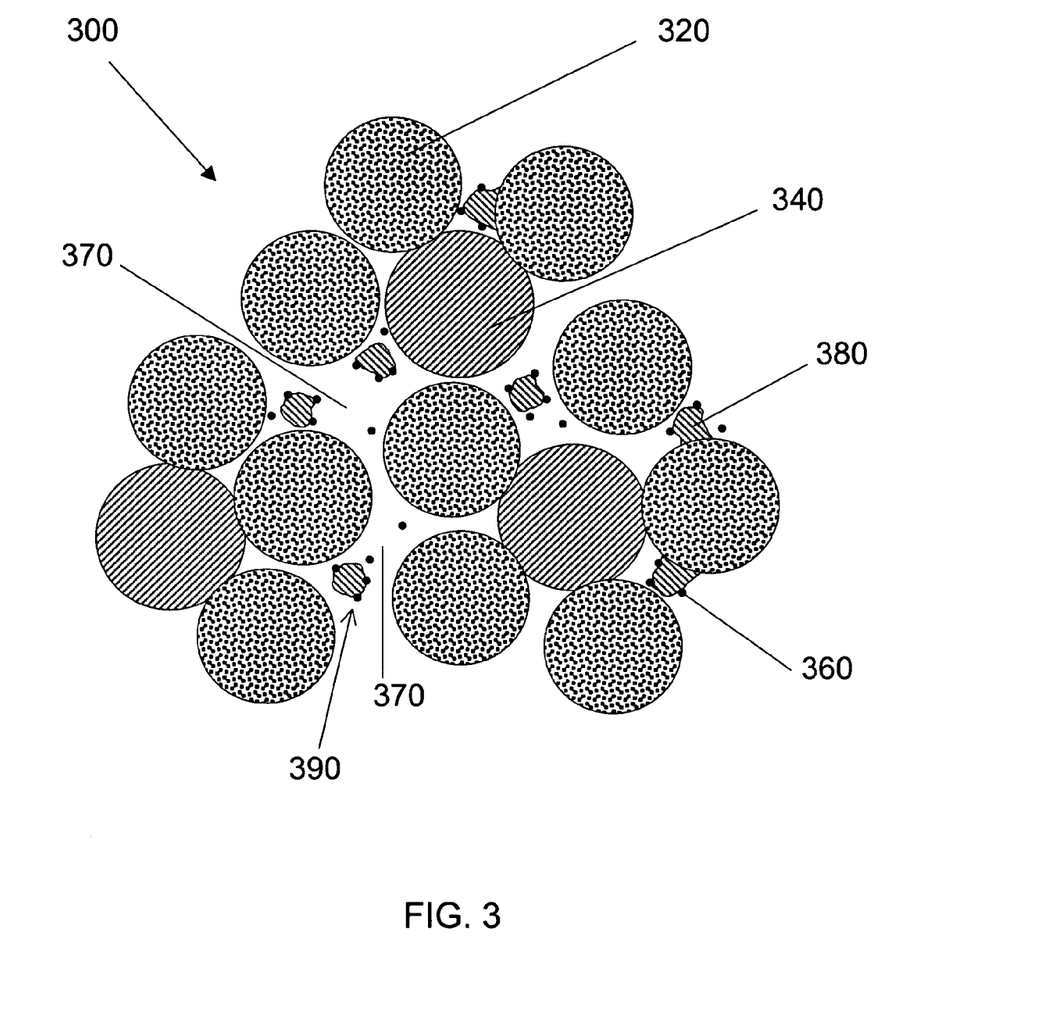
FIG. 3 is a schematic cross section of a matrix as shown in FIG. 1, which also contains some free actives that have agglomerated with second small binder particles in the spaces within the matrix.

FIG. 3 is an exemplary illustration of how small actives in porous composite block filters can be held within the blocks, according to an embodiment of the invention. A portion 300 of a porous carbon block structure shows several activated carbon grains 320 bonded onto large binder particles 340 to form a basic structure for a porous composite carbon block filter as has been discussed above with reference to FIG. 1. There are also active granules 360 and small binder particles 380 interspersed throughout the basic structure. In this example, the activated carbon grains 320 have a grain size of about 100 µm, the large binding agent particles 340 have a particle size of about 110 µm, the active granules 360 have a granule size of about 5 μm, and the small binder particles 380 have a particle size of about 30 μm.

The small binder particles 380 and the active granules 360 tend to occupy spaces in the basic structure that is formed by the activated carbon grains 320 and the large binder particles 340. The small binder particles 380 and the active granules 360 can form agglomerates 390 within the spaces in the basic structure. It is most useful when the agglomerates can form with a minimum of active granule 360 surface loss. There can also be unbound small binder particles 380 and active granules 360 within the block structure.

Careful choice of not only small binder particle sizes, but also small binder particle composition and block treatment conditions can ensure minimum active granule 360 surface loss. Factors that can be considered in choosing a binder include the chemical structure of the binder material and how it will interact with the active granules and the viscosity (such as predicted by the melt flow index, MFI) of the binder material at the processing temperature. In the case of polymer binders, factors that can affect MFI include molecular weight and degree of branching in the polymer structure. Other factors to consider include processing temperature, time, and compression, as well as the amount of binder material in the mixture.

Many agglomerates 390 are too large to move out of the spaces 370 in the basic structure formed by the activated carbon grains 320 and the large binder particles 340 and are therefore trapped inside the block 300. Some agglomerates 390 can also bond onto some activated carbon grains 320 and/or some large binder particles 340. Thus, a substantial portion of active granules 360 can be trapped within the block 300 and are available to provide the water treatment intended.

The small binder particles 380 and agglomerates 390 can also occupy positions in the spaces 370 of the block 300 that narrow pathways within the basic structure formed by the activated carbon grains 320 and the large binder particles 340. Some narrowing of pathways can be useful as it can prevent unbound small active granules 360 from escaping during water flow. On the other hand, too much narrowing of pathways can contribute to clogging of the block filter.

In some arrangements, the small binder particles 380 and the active granules 360 have opposite electrostatic charges and are therefore attracted to one another electrostatically to enhance formation of agglomerates 390.

Multicomponent binder systems are especially useful in applications where it is desirable to support small granules without complete encapsulation. Agglomeration of small active granules and small binder particles becomes even more useful as the available sizes of both active granules and binder particles become smaller and smaller. Small active granules are available in sizes much smaller than 10 μm, and even as small as nanoscale. Nanoparticles of many common materials, such as metals, minerals, compounds, metal oxides and alloys, can be produced easily with sizes as small as 10 nanometers.

Advancements in polymer technology are leading to more widespread availability of powdered polymers with average particle sizes less than 50 microns. Currently, low density polyethylene, polypropylene, nylon 12 and ethylene copolymers are commercially available in sizes below 10 microns. As the field of nanotechnology grows, smaller and smaller binder particles are becoming available for porous composite blocks. Polymer nanoparticles have been disclosed by Noid in U.S. Pat. No. 6,461,546, and by Otaigbe in U.S. Pat. No. 6,171,433, both of which are included by reference herein.

In one embodiment of the invention, a porous composite block contains at least two groups of binding agent particles, the first group having an average particle size at least twice as large as the average particle size of the second group. The first binding agent particles can have an average particle size between about 5 μm and 200 μm. The second binding agent particles can have an average particle size between about 10 nm and 30 μm. In one arrangement, the first binding agent particles have an average particle size between about 50 μm and 150 μm. In another arrangement, the second binding agent particles have an average particle size between about 100 nm and 20 μm. Although there may be overlap in some average particle size ranges for binding agent particles from the two groups, combinations of sizes wherein the first binding agent particles are not at least twice as large as the second binding agent particles are not within the scope of this embodiment. The porous composite block can also contain active grains and active granules, the active granules having a size much smaller than the active grains.

In some embodiments, the binder particles are all made of the same organic or inorganic material. In other embodiments, binder particles made of various materials can be used together in the same porous composite block.

In some arrangements, the first binding agent particles contain an organic material. For example, the first binding agent particles can be a polymer. Possible polymers for the first binding agent particles include ultra high molecular weight (UHMW) polyethylene, polyethylene homopolymers, modified polyethylene homopolymers, ethylene copolymers, ethylene-based ion-containing copolymers, fluoropolymers, nylon, polypropylene, and combinations thereof. The second binding agent particles can be an organic material(s) or they can be an inorganic material(s), such as a cement. Magnesium cements containing chlorides, such as Sorel cement, can be used. Magnesium cements containing sulfates, nitrates, phosphates, or fluorides can be used. Magnesium oxy phosphate can also be used.

In one arrangement, the first binding agent particles have a melt flow index (MFI) less than about 1 gm/10 min at 190 C with a 15 kg load. Possible materials include UHMW polymers, such as UHMW polyethylene. The smaller second binding agent particles can consist of another polymer such as a polymer with a higher MFI, such as an MFI greater than 1 gm/10 min. Examples include polyethylene homopolymers, modified polyethylene homopolymers, ethylene copolymers, ethylene-based ion-containing copolymers, polyethylene homopolymers, modified polyethylene homopolymers, ethylene copolymers, ethylene-based ion-containing copolymers, and combinations thereof.

First binding agent particles and second binding agent particles can be combined with active grains and active granules in a homogeneous mixture and then be processed to form a porous composite block for fluid filtration. The average particle size of the first binding agent particles is at least twice as large as the average particle size of the second binding agent particles. It can be advantageous to choose processing conditions, such as temperature and pressure, which cause the smaller second binding agent particles to begin to melt and flow while allowing the larger first binding agent particles to begin to soften without melting. Such a processing condition can lead to formation of a structural matrix containing mainly the larger active grains and first binding agent particles. Some smaller active granules and second binding agent particles can agglomerate and attach themselves to the matrix or become trapped in spaces within the matrix. All components, i.e., active grains, active granules, first binding agent particles, and second binding agent particles are distributed homogeneously throughout the block. A block is considered homogeneous if the block is substantially the same when samples on the order of a few times the size of the largest component (such as a grain or a binding agent particle) are examined throughout the block In some arrangements, at least some binding agent particles, such as some second binding agent particles, are electrostatically charged. When active granules are also charged, but with an opposite charge, agglomerates of second binding agent particles and granules can form more easily.

In some arrangements, the first binding agent particles and the second binding agent particles contain the same material, such as the same polymer, and differ only in their average particle sizes.

In some arrangements, the first binding agent particles are made of one polymer and the second binding agent particles are made of another polymer that has a different chemical structure.

In some arrangements, the first binding agent particles consist of a polymer and the second binding agent particles consist of the same polymer, but with a different polymer geometry. For example, the first binding agent particles can have a geometry that is highly branched and the second binding agent particles can have a geometry that is nearly linear, or vice versa.

In some arrangements, the first binding agent particles contain a polymer with a very high molecular weight, such as between about 250,000 g/mol and 10,000,000 g/mol. The second binding agent particles can contain a polymer with a lower molecular weight, such as between about 1000 g/mol and 250,000 g/mol.

In one embodiment of the invention, a mixture for forming a porous composite block is provided. The mixture includes particles of a first binding agent and particles of a second binding agent. The binding agents are distributed homogeneously throughout the mixture. The first binding agent particles and the second binding agent particles differ at least in their average particle sizes. The first binding agent particles have an average particle size between about 5 μm and 200 μm, the second binding agent particles have an average particle size between about 10 nm and 30 μm, and, at the same time, the average particle size of the first binding agent particles is at least twice as large as the average particle size of the second binding agent particles. For example, the first binding agent particles can be a polymer with an average particle size of about 120 μm and the second binding agent particles can be a polymer with an average particle size of about 15 μm.

Grains of a first component and granules of a second component can be included homogeneously with the binding agent particles in the mixture for forming a porous composite block. The grains are larger than the granules. For example, the grains can be an active water filtration medium, such as activated carbon, with an average grain size of about 100 μm. The granules can be another active water filtration medium, such as a lead scavenger, with an average granule size that is between about 1 nm and half the average grain size, such as about 5 μm. In some arrangements, the second binding agent particles have an average particle size that is between about ten times smaller than and ten times larger than the average granule size and also no more than half as large as the first binding agent particles. In other arrangements, the second binding agent particles have an average particle size that is between about five times smaller than and five times larger than the average granule size and also no more than half as large as the first binding agent particles.

A multiple-component binder system can result in using less total binder to make a porous composite block. Reduction in the total amount of binder can result in smaller blocks with the same efficiency as is known currently, or blocks of a size similar to those currently known, but with even greater efficiency.

According to some embodiments of the invention, the interaction between the grains or granules and the binder particles results in a chemical bond, that is, a bond that involves electron transfer or sharing. Examples of chemical bonds include covalent bonds, metallic bonds, and ionic bonds. In other embodiments, the interaction between the grains or granules and the binder particles results in a physical bond, that is a bond that results from interactions among atomic or molecular dipoles. An example of a physical bond is a van der Waals bond.

In another embodiment of the invention, a fluid treatment system is provided. The fluid treatment system contains a porous composite block according to any of the embodiments and arrangements that have been described above. In addition, the fluid treatment system contains a fluid source. The porous composite block is configured to receive fluid from the fluid source. The fluid can move through the porous composite block either pulled through by the force of gravity alone, or pushed through by fluid pressure from a plumbing system, such as by household water pressure. As the fluid moves through at least a portion of the porous composite block, the fluid is treated. There is an outlet portion associated with the porous composite block, through which the treated fluid can leave the block.

Figure 4:
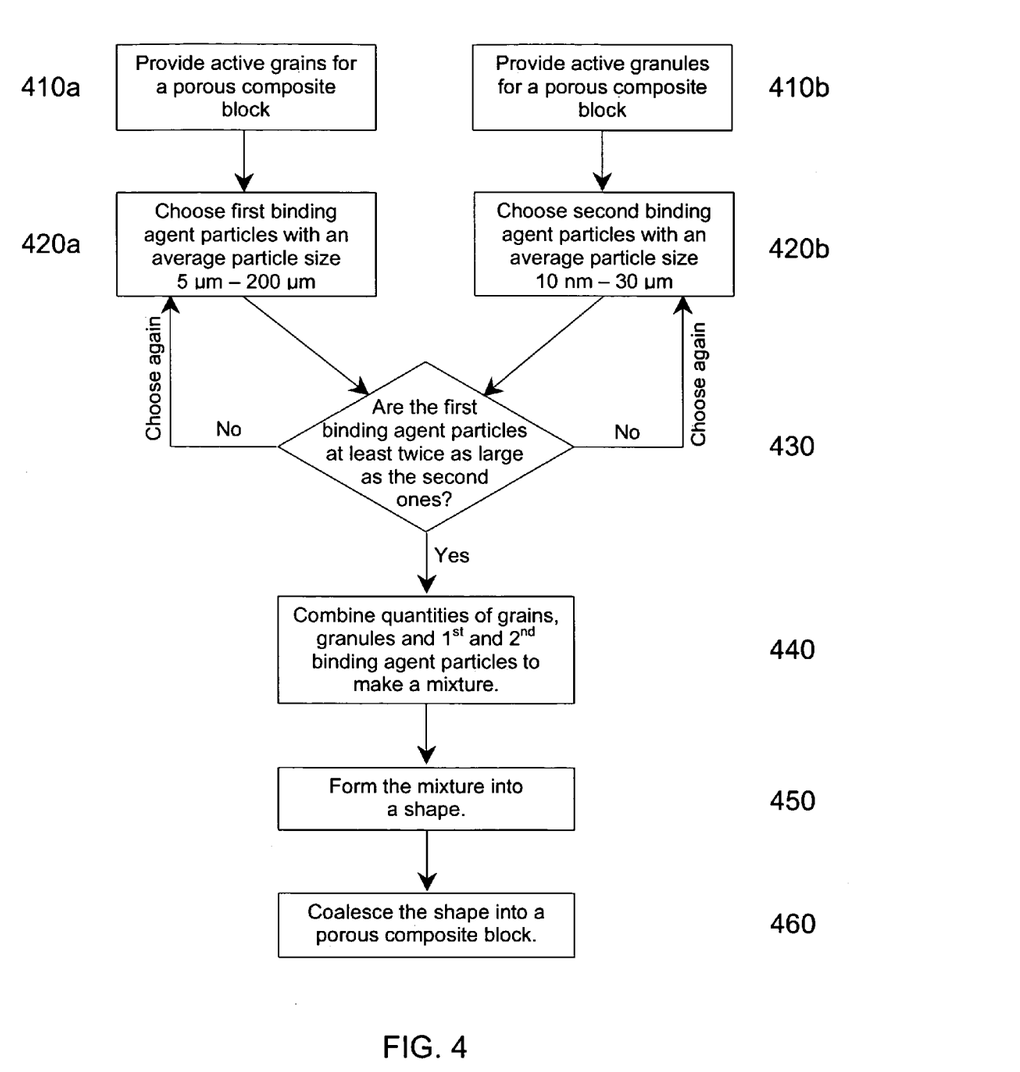
FIG. 4 is a flow chart that outlines a method of forming a porous composite block, according to an embodiment of the invention.

A method of making a porous composite block for fluid treatment, according to an embodiment of the invention is outlined in the flowchart in FIG. 4. The flowchart describes a method of making a porous composite block that contains two different types of active media, active grains, such as activated carbon, and smaller active granules, such as a lead scavenger.

In step 410a active grains are provided for the porous composite block. In step 410b active granules are provided for the porous composite block. In step 420a first binding agent particles that have an average particles size between about 5 μm and 200 μm are chosen. The first binding agent particles can be made of either organic or inorganic materials capable of acting as binders. In step 420b second binding agent particles that have an average particles size between about 10 nm and 30 μm are chosen. The second binding agent particles can be made of either organic or inorganic materials capable of acting as binders.

In step 430 the sizes of the first binding agent particles and the second binding agent particles are compared to determine whether the first binding agent particles are at least twice as large as the second binding agent particles. If the binding agent particle sizes do not meet this criterion, steps 420a and/or 420b are repeated to choose different binding agent particle size(s) and the criterion of step 430 is applied again. This loop is repeated until the criterion is met.

In step 440 quantities of grains, granules, first binding agent particles, and second binding agent particles are combined to form a mixture. In step 450 the mixture is formed into a shape. Forming a shape can involve such techniques as introducing the mixture into a mold or extruding the mixture through a die. In step 460 the shape is coalesced into a porous composite block. Coalescing the shape can include such methods as allowing the mixture to set or supplying energy to cause the setting. Energy can be supplied in the forms of electromagnetic radiation, radiative heating, inductive heating, electrically resistive heating, exothermic reactions, electric field, magnetic field, ultrasound, and/or light. In some arrangements, the shape can be heated to a temperature between about 50° C. and 300° C. In other arrangements, the shape can be heated to a temperature between about 150° C. and 250° C. In yet other arrangements, a temperature can be chosen that causes the first binding agent particles to begin to soften slightly while, at the same time, causes the second binding agent particles to begin to melt.

The method of making a porous composite block for fluid treatment is not limited to two active components (grains and granules) and two binder components. Any number of active components and binders can be used to make a porous composite block for fluid treatment. In some arrangements, especially when a variety of active granules with differing average sizes are used, an additional criterion can be applied for choosing binding agent particles, as has been described above. The second, or third, or $n^{th}$ binding agent particles can have an average particle size that is between about 10 times smaller than and 10 times larger than the average granule size and also no more than half as large as the first binding agent particles. In one arrangement, the second, or third, or $n^{th}$ binding agent particles can have an average particle size that is between about five times smaller than and five times larger than the average granule size and also no more than half as large as the first binding agent particles.

EXAMPLE 1

One Size Binder Particles

A porous carbon block was prepared using 70 wt % (weight percent) 80×325 mesh activated coconut carbon, 20 wt % GUR 2105 (very high molecular weight polyethylene, 120 micron average particle size, available from Ticona) binder and 10 wt % lead scavenger (5 μm average particle size). The components were added to a mixer bowl and mixed for 20 minutes at the medium speed setting to achieve a uniform mixture. The bottom puck and center rod were inserted into a cylindrical block mold. The mixture was poured into the cylindrical block mold in a cylindrical pattern to ensure even distribution of the media. The top puck was inserted into the mold, and the full mold was placed in an oven at 245° C. for 40 minutes. The fully heated mold was removed from the oven and placed in a Carver lab press where the required amount of compression was added to produce a porous carbon block capable of 0.7 gpm (gallons per minute) at a water pressure of 60 psi (pounds per square inch).

The porous carbon block removed more than 99.9% of lead in 120 gallons of challenge water at 60 psi and 0.7 gpm. Turbidity after the initial 1 liter of flow was 35 NTU and after 5 liters of flow was 1.2 NTU.

EXAMPLE 2

One Size Binder Particles

The procedure as described in Example 1 was used to prepare a carbon block containing 75 wt % 80×325 mesh activated coconut carbon, 20 wt % GUR 2105 (very high molecular weight polyethylene, 120 μm average particle size, available from Ticona) binder and 5 wt % lead scavenger (5 μm average particle size). The difference between Example 2 and Example 1 is the addition of 5 wt % activated carbon and the resulting reduction of 5 wt % lead scavenger.

The porous carbon block removed 89.9% of lead from 120 gallons of challenge water at 60 psi and 0.7 gpm. Turbidity after the initial 1 liter of flow was 3.2 NTU and after 5 liters of flow was 0.9 NTU.

EXAMPLE 3

Two Different Sizes of Binder Particles

A porous carbon block was prepared using 75 wt % 80×325 mesh activated coconut carbon, 15 wt % GUR 2105 (very high molecular weight polyethylene, 120 μm average particle size, available from Ticona) binder, 5 wt % FN510 (low density polyethylene, 20 μm average particle size, available from Equistar) and 5 wt % lead scavenger (5 μm average particle size). The difference in the components between Example 3 and Example 2 is the addition of 5 wt % FN510 and the resulting reduction of 5 wt % GUR2105. The procedure as described in Example 1 was used except there was a reduction in the oven temperature from 245° C. to 225° C.

The porous carbon block removed more than 99.9% of lead from 120 gallons of challenge water at 60 psi and 0.7 gpm. Turbidity after the initial 1 liter of flow was 5.5 NTU and after 5 liters of flow was 0.3 NTU.

Particulars on the porous carbon blocks from the examples are summarized in Table I below. Example 1 shows very high turbidity but excellent lead removal. Example 2 shows low turbidity but poor lead removal. Example 3 shows low turbidity and excellent lead removal. The reduction in lead scavenger in Example 2 is enough to lower the lead removal capacity of that block, unlike what is shown in Example 3 which had the same amount of lead scavenger initially. In all three examples, the turbidity was due primarily to the loss of lead scavenger particles from the porous carbon block.

TABLE I

| Component (wt %) | Example 1 | Example 2 | Example 3 |
| --- | --- | --- | --- |
| Activated carbon | 70 | 75 | 75 |
| Large particle binder | 20 | 20 | 15 |
| Small particle binder | 0 | 0 | 5 |
| Lead scavenger | 10 | 5 | 5 |
| Performance | | | |
| Lead removal in 120 gal | >99.9% | 89.9% | >99.9% |
| Turbidity at 1 liter | 35 | 3.2 | 5.5 |
| Turbidity at 5 liters | 1.2 | 0.9 | 0.3 |

The data show that the porous composite block filter in Example 3, which used less lead scavenger and a two-component binder particle system was able to perform as well or better than the filter in Example 1, which used only one binder and twice as much lead scavenger.

This invention has been described herein in considerable detail to provide those skilled in the art with information relevant to apply the novel principles and to construct and use such specialized components as are required. However, it is to be understood that the invention can be carried out by different equipment, materials and devices, and that various modifications, both as to the equipment and operating procedures, can be accomplished without departing from the scope of the invention itself.

We claim:

1. A porous composite block, comprising:
   first binding agent particles, having an average particle size between about 5 µm and 200 µm, said first binding agent particles primarily binding active grains together to form a matrix having void spaces throughout; and
   second binding agent particles, having an average particle size which is no larger than half the average particle size of the first binding agent particles and which is also between about 10 nm and 30 µm, said second binding agent particles primarily binding active granules to form agglomerates that are trapped in the void spaces of the matrix;
   wherein the active grains, the first binding agent particles, the active granules and the second binding agent particles are dispersed homogeneously throughout the block.

2. A porous composite block, comprising:
   active grains and first binding agent particles, which form a matrix having void spaces throughout; and
   a plurality of active granules and second binding agent particles which form agglomerates that are dispersed homogeneously throughout the void spaces in the matrix;
   wherein the first binding agent particles have an average particle size, the second binding agent particles have an average particle size, and the average particle size of the first binding agent particles is at least twice as large as the average particle size of the second binding agent particles.

3. The block of claim 2 wherein the active grains and the active granules comprise different materials and are each selected from the group consisting of activated carbon, activated alumina, activated bauxite, fuller's earth, diatomaceous earth, sand, glass, clay, silica gel, calcium sulfate, magnesia, ceramic particles, zeolite particles, inert particles, silica, mixed oxides, surface charge-modified particles, cationic materials which may be bound to fibers, carbon fibers, metal oxides, metal hydroxides and mixtures thereof.

4. The block of claim 3 wherein the cationic materials are selected from the group of polymer consisting of polyaminoamides, polyethyleneimine, polyvinylamine, polydiallyld imethylammonium chloride, polydimethylamine-epichlorohydrin, polyhexamethylenebiguanide, and poly-[2-(2-ethoxy)-ethoxyethyl-guani-dinium chloride].

5. The block of claim 3 wherein the fibers are selected from the group consisting of polyethylene, polypropylene, ethylene maleic anhydride copolymers, carbon, and glass.

6. The block of claim 2 wherein the first binding agent particles have an average particle size between about 5 µm and 200 µm.

7. The block of claim 2 wherein the first binding agent particles have an average particle size between about 50 µm and 150 µm.

8. The block of claim 2 wherein the second binding agent particles have an average particle size which is between about 10 nm and 30 µm.

9. The block of claim 2 wherein the second binding agent particles have an average particle size which is between about 100 nm and 20 µm.

10. The block of claim 2 wherein the first binding agent particles comprise an organic material.

11. The block of claim 10 wherein the first binding agent particles comprise a first polymer and the second binding agent particles comprise a second polymer having a chemical structure different from the first polymer.

12. The block of claim 10 wherein the first binding agent particles comprise a polymer and the second binding agent particles comprise an inorganic material.

13. The block of claim 12 wherein the first binding agent particles comprise a polymer selected from the group consisting of polyethylene homopolymers, modified polyethylene homopolymers, ethylene copolymers, ethylene-based ion-containing copolymers, and combinations thereof.

14. The block of claim 12 wherein the second binding agent particles comprise an inorganic material selected from the group consisting of magnesium cements.

15. The block of claim 2 wherein the first binding agent particles and the second binding agent particles each comprise a material selected from the group consisting of polyethylene homopolymers, modified polyethylene homopolymers, ethylene copolymers, ethylene-based ion-containing copolymers, fluoropolymers, nylon, polypropylene, and magnesium cements.

16. The block of claim 2 wherein the first binding agent particles have a melt index less than about 1 gm/10 min at 190° C. with a 15 kg load.

17. The block of claim 2 wherein at least some binding agent particles are electrostatically charged.

18. The block of claim 17 wherein at least a portion of the second binding agent particles are electrostatically charged.

* * * * *